(12) United States Patent
Davis

(10) Patent No.: US 7,529,975 B1
(45) Date of Patent: May 5, 2009

(54) METHOD FOR TESTING PROCESSOR SUBASSEMBLIES

(75) Inventor: Warren R. Davis, Modena, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/058,788

(22) Filed: Mar. 31, 2008

(51) Int. Cl.
*G06F 11/00* (2006.01)

(52) U.S. Cl. .......................... 714/27; 714/716; 370/249

(58) Field of Classification Search .................. None
See application file for complete search history.

(56) References Cited

U.S. PATENT DOCUMENTS

| | | | |
|---|---|---|---|
| 5,642,363 A | | 6/1997 | Smith |
| 5,956,370 A | * | 9/1999 | Ducaroir et al. ............. 375/221 |
| 5,999,528 A | * | 12/1999 | Chow et al. ................. 370/365 |
| 6,031,843 A | * | 2/2000 | Swanbery et al. ........... 370/426 |
| 6,324,062 B1 | * | 11/2001 | Treiber et al. ............... 361/727 |
| 6,385,739 B1 | * | 5/2002 | Barton et al. ................. 714/25 |
| 6,449,732 B1 | * | 9/2002 | Rasmussen et al. .......... 714/12 |
| 6,611,518 B1 | * | 8/2003 | Ngo et al. ................... 370/386 |
| 6,950,968 B1 | * | 9/2005 | Parolari et al. ................ 714/43 |
| 7,346,819 B2 | | 3/2008 | Bansal et al. |
| 7,428,679 B2 | | 9/2008 | Evans |
| 2006/0176826 A1 | | 8/2006 | Archer et al. |

* cited by examiner

*Primary Examiner*—Gabriel L Chu
(74) *Attorney, Agent, or Firm*—Cahn & Samuels, LLP

(57) ABSTRACT

A method for testing a processor subassembly includes providing a computer system comprising subassemblies. Each subassembly includes processors having internal communication paths and ports that provide external communication paths to other subassemblies via a midplane circuit board. For each subassembly, a first port is connected to a second port via the midplane circuit board, thereby re-routing external communication paths back to the subassembly instead of to other subassemblies and allowing communication between the processors through external paths. Each subassembly can be tested one at a time.

1 Claim, 7 Drawing Sheets

| Port | SA1 | SA2 | SA3 | SA4 | SA5 | SA6 | SA7 | SA8 |
|------|-----|-----|-----|-----|-----|-----|-----|-----|
| 1 | ▌ | ▌ | ▌ | ▌ | ▌ | | | |
| 2 | ▌ | ▌ | ▌ | ▌ | | ▌ | ▌ | ▌ |
| 3 | ▌ | ▌ | | ▌ | ▌ | ▌ | ▌ | ▌ |
| 4 | ▌ | ▌ | ▌ | ▌ | | | ▌ | ▌ |
| 5 | ▌ | ▌ | ▌ | | | | ▌ | |
| 6 | ▌ | ▌ | ▌ | ▌ | ▌ | ▌ | ▌ | ▌ |
| 7 | ▌ | ▌ | ▌ | ▌ | ▌ | ▌ | ▌ | ▌ |

FIG. 4

| Port | SA1 | SA2 | SA3 | SA4 | SA5 | SA6 | SA7 | SA8 |
|------|-----|-----|-----|-----|-----|-----|-----|-----|
| 1    |     |     |     |     |     |     |     |     |
| 2    | ⌐⌐  |     |     |     |     |     |     |     |
| 3    |     |     |     |     |     |     |     |     |
| 4    | ⌐⌐  |     |     |     |     |     |     |     |
| 5    |     |     |     |     |     |     |     |     |
| 6    | ⌐⌐  |     |     |     |     |     |     |     |
| 7    | ⌐   |     |     |     |     |     |     |     |

FIG. 6

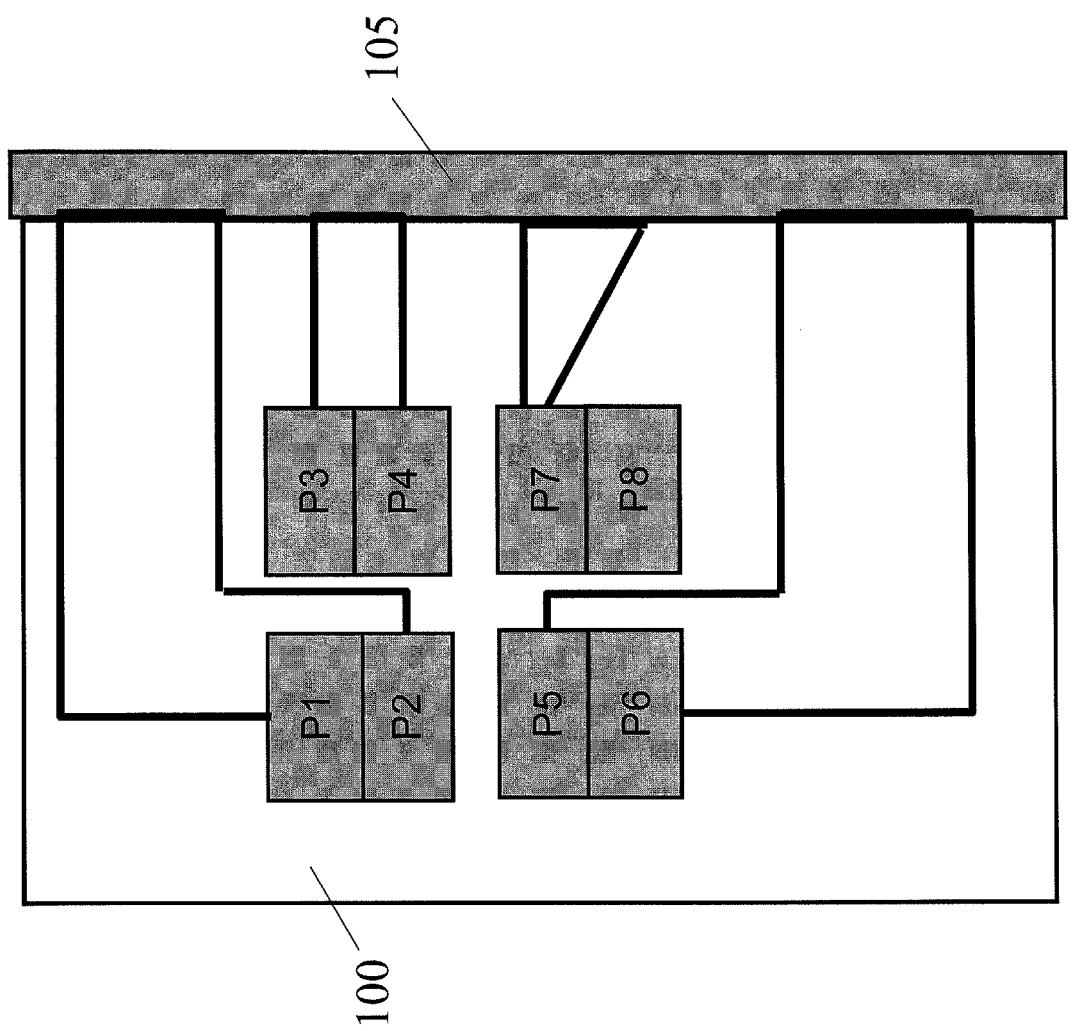

METHOD FOR TESTING PROCESSOR SUBASSEMBLIES

I. FIELD OF THE INVENTION

This invention relates to a system and method for testing mainframe computer processor subassemblies.

II. BACKGROUND OF THE INVENTION

In mainframe computer multi-processor packaging designs, subassemblies containing a fraction of the total system processors are interconnected to allow direct communication and sharing of resources (e.g., memory) between all system processors.

Testing of data and communication paths within a subassembly (internal communication paths) to their interface with external paths often requires a full system's complement of subassemblies in order to exercise all of the paths. For example, a system with 8 subassemblies would require all 8 subassemblies to be interconnected to test all of the communication and data paths. Starting a test with all 8 subassemblies previously untested creates an exposure to having multiple subassemblies failing. In addition, this situation results in considerable failure isolation activity and time to determine which subassemblies are working versus which subassemblies are failing.

An alternative process may start with 7 tested subassemblies and one untested subassembly installed in a system. The untested subassembly (tester) would be the target of the test. However, this strategy drives additional inventory in setting up a system with 7 good, tested subassemblies. For example, if a manufacturing line required 20 testers, 140 known good subassemblies would need to be held captive for these testers. If subassemblies cost, for example $30,000 each, then the cost of the inventory held captive would be $4,200,000.

Another alternative process may be to design circuit cards (wrap cards) that simulate a processor subassembly by connecting communication input paths to communication output paths. In the example above using 8 subassemblies, 7 design circuit cards would be needed to account for the differences at each subassembly plug location. Also, each of the 7 design circuit cards would need to be plugged in each tester. This is a costly solution in the design, release, and manufacture of 7 cards per untested subassembly (tester).

III. SUMMARY OF THE INVENTION

This invention provides a method for testing a processor subassembly. A computer system includes subassemblies, each subassembly comprising processors having internal communication paths and ports that provide external communication paths to other subassemblies via a midplane circuit board. For each subassembly, a first port is connected to a second port via the midplane circuit board, thereby re-routing external communication paths back to the subassembly instead of to other subassemblies and allowing communication between the processors through external paths. Each subassembly can be tested one at a time.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and method should become evident to a person of ordinary skill in the art.

IV. BRIEF DESCRIPTION OF THE DRAWINGS

FIG. 4 illustrates the midplane port connections between the subassemblies of FIG. 1.

FIG. 6 is a diagram of the subassembly connections of FIG. 5.

FIG. 7 illustrates the midplane port connections for the subassembly of FIG. 5.

V. DETAILED DESCRIPTION OF THE DRAWINGS

FIGS. 1-7 illustrate a system and methods for testing mainframe computer processor subassemblies. According to the present invention, processor subassemblies are tested one at a time, while exercising all of the communication paths and interconnection ports.

A mainframe computer system comprises a plurality of subassemblies or nodes. Each subassembly comprises processors, for example, processors mounted on a circuit card. For the purposes of the discussion below, a computer system comprising 8 subassemblies (8w), with each subassembly comprising 7 ports will be used as a non-limiting example. This number of subassemblies is merely illustrative.

According to the present invention, a method for testing each subassembly one at a time and without the need for additional inventory comprises externally connecting the subassembly ports via a midplane, thereby allowing communication between the processors internal to the subassembly through external paths. For example, in a system with 8 subassemblies that connect to a common midplane circuit board (which provides the communication paths), the midplane circuit board is designed to re-route the communication paths back to the internal processors instead of out to the other processor subassemblies.

After re-routing of the communication paths, an Initial Program Load (IPL) and normal system exercises may be run to test each subassembly thus connected. Testing in this way eliminates the time required to identify good subassemblies versus bad subassemblies in the case where all subassemblies are untested. Such testing also eliminates the excess inventory required for known subassembly testing strategies.

According to the present invention, the same re-routing concept can be applied to more than one subassembly at a time. For example, to test multiple subassemblies or nodes (e.g., 4 subassemblies), the ports may be wrapped. In an embodiment, 3 spare subassemblies could be wrapped for a single subassembly test.

Figure 1:
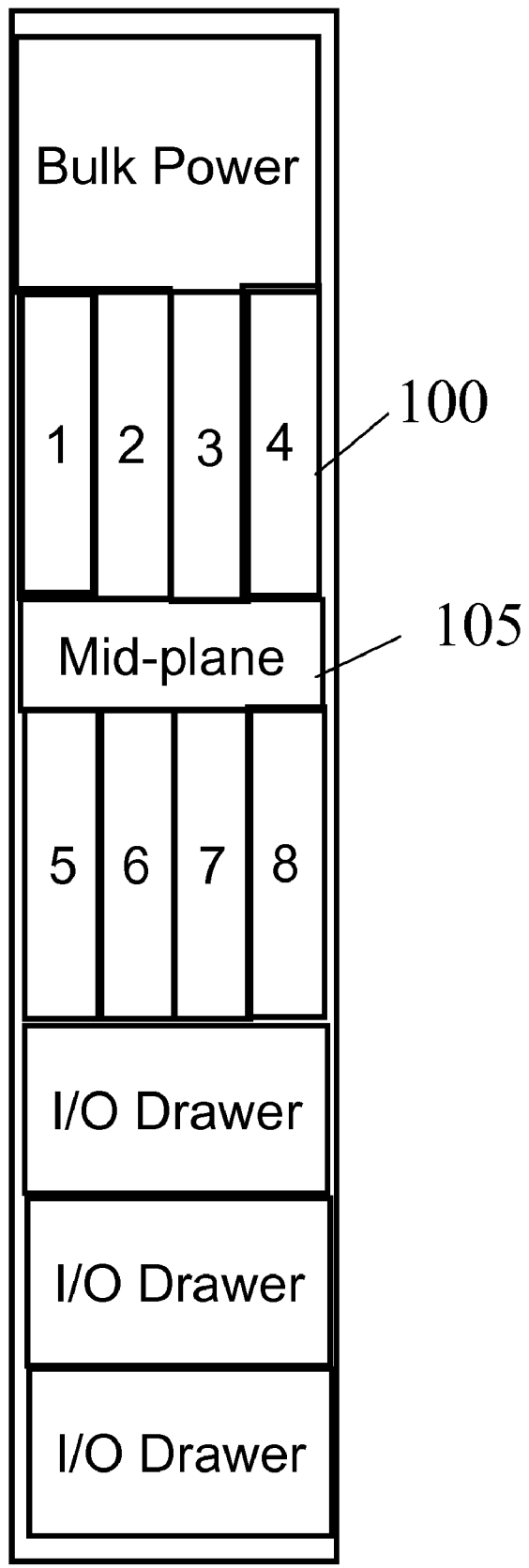
FIG. 1 illustrates a mainframe computer system having 8 processor subassemblies according to the prior art.

FIG. 1 illustrates a mainframe computer system comprising 8 processor subassemblies 100 according to the prior art. The 8 subassemblies are connected via midplane 105, which provides communication paths between the subassemblies.

Figure 2:
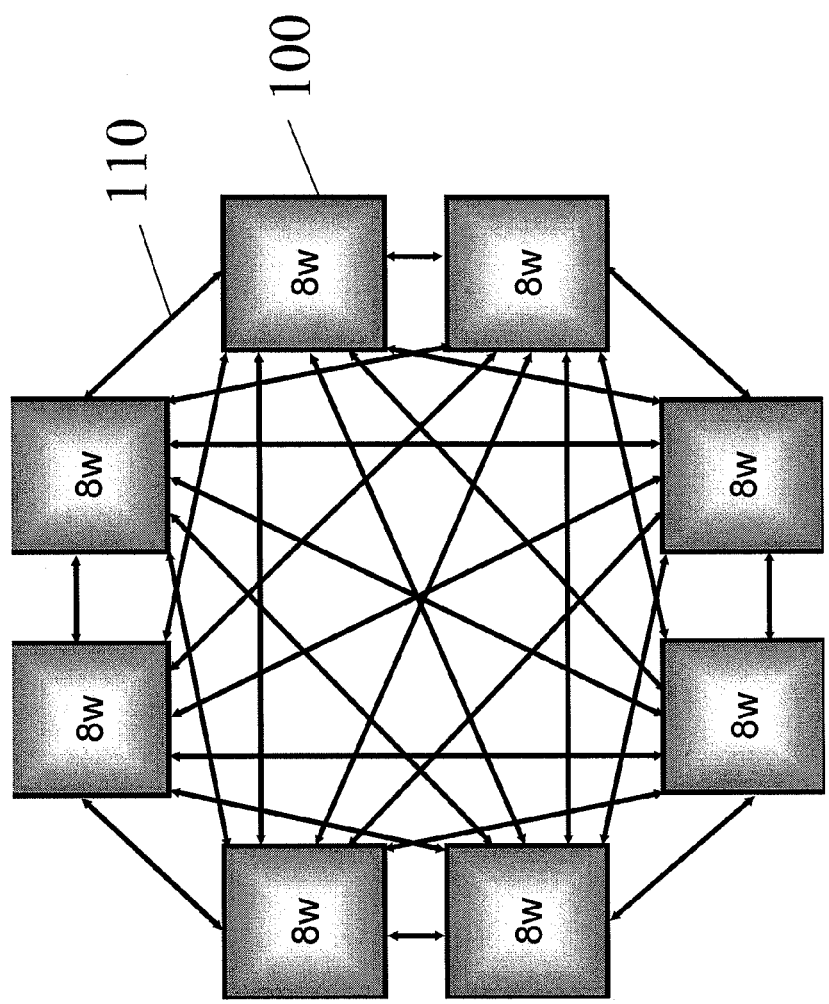
FIG. 2 is a schematic diagram of the external communication paths between the subassemblies of FIG. 1.
Figure 3:
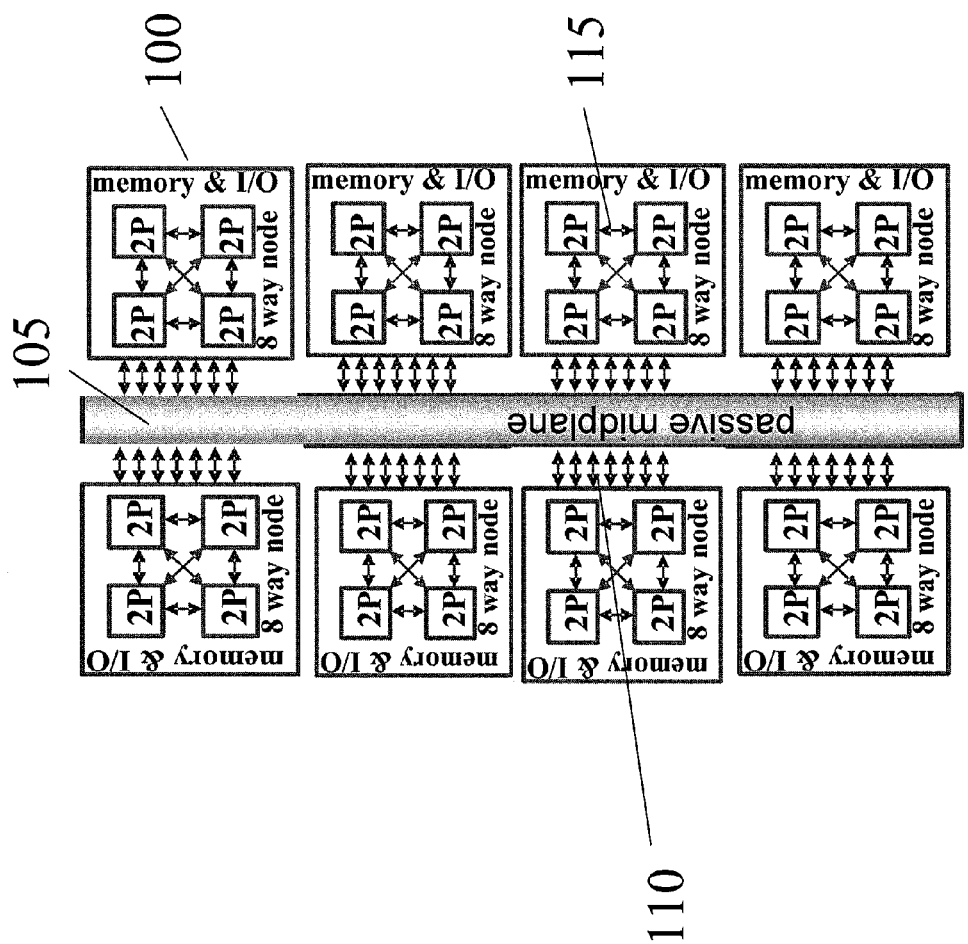
FIG. 3 illustrates the internal and external communication paths of the subassemblies of FIG. 1.

FIG. 2 is a schematic diagram of the external communication paths between the subassemblies 100 of FIG. 1. Each subassembly 100 has 7 external communication paths 110, each path to one of the other of the subassemblies 100. FIG. 3 illustrates subassembly external communication paths 110 to other subassemblies via midplane 105 and internal communication paths 115 between the processors of each subassembly (8w or 8-way subassembly or node).

Figure 4:
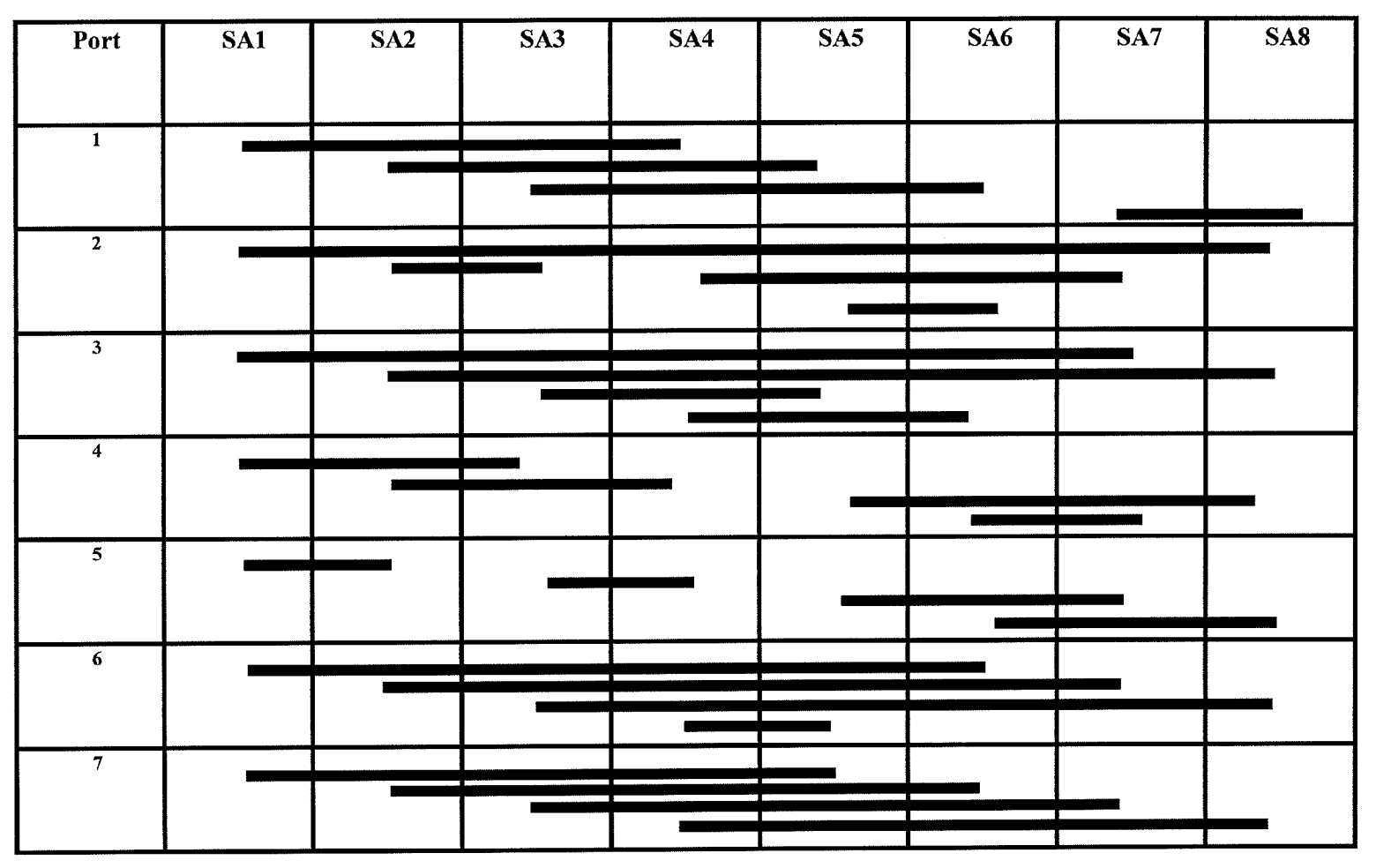

FIG. 4 illustrates the external communication paths (via port connections) for the subassemblies 100 of FIG. 1 via midplane 105. For example, port 1 of subassembly 1 (SA1) is connected to port 1 of subassembly 4 (SA4) via the midplane. Port 2 of subassembly 1 (SA1) is connected to port 2 of subassembly 8 (SA8).

According to the present invention, a method for testing each subassembly one at a time comprises re-routing the external communication paths by connecting ports via the midplane, thereby allowing communication between the processors internal to the subassembly through external paths.

Figure 5:
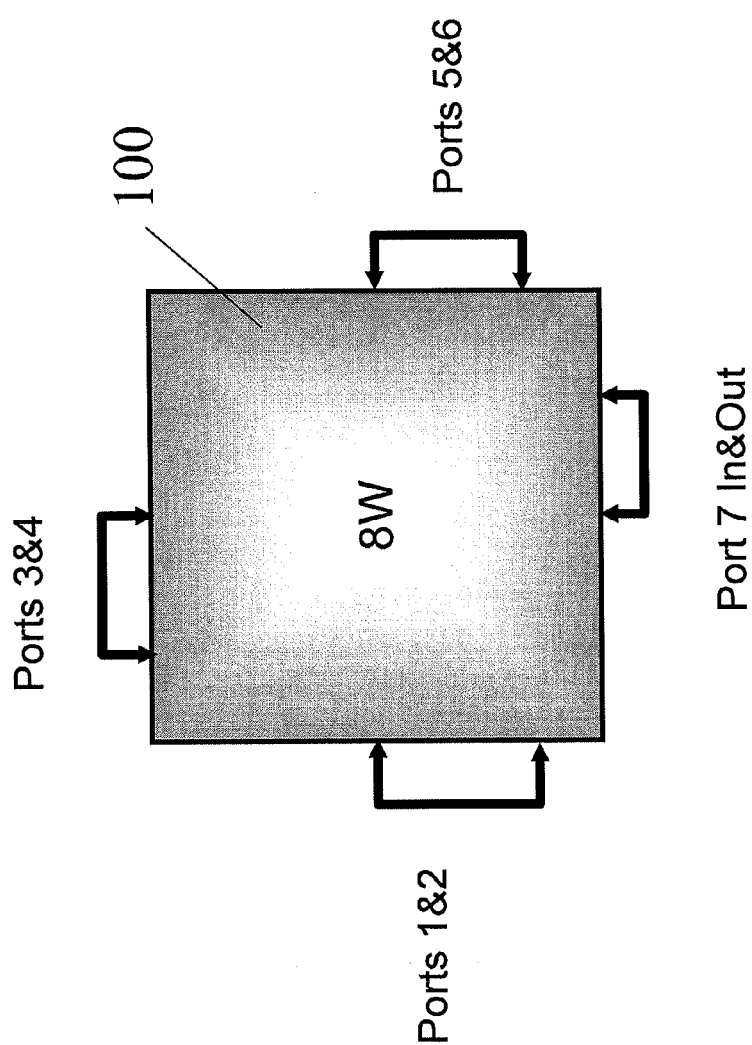
FIG. 5 illustrates connection of subassembly ports for testing according to an embodiment of the present invention.

FIG. 5 illustrates re-routing subassembly communication paths according to the present invention. A port is the interface for a bidirectional bus that is, for example, 8 Bytes (64 bits) wide. Each line in the figures represents 64 bidirectional data lines plus some control lines. The data lines of a port can be used either as outputs or as inputs, from or to the processors. For a single subassembly 100, each port is connected to another port. For example, port 1 is electrically connected to port 2; port 3 is electrically connected to port 4; port 5 is electrically connected to port 6. For the last port 7, using half the data lines as outputs and the other half as inputs, it is possible to wrap a port within itself to solve the problem of an odd number of ports.

Thus, the external communication paths are re-routed back to the internal processors instead of to the other subassemblies. Accordingly, each subassembly can be tested individually. In embodiments, each subassembly of a system may be rerouted according to the present invention and tested sequentially.

Figure 6:
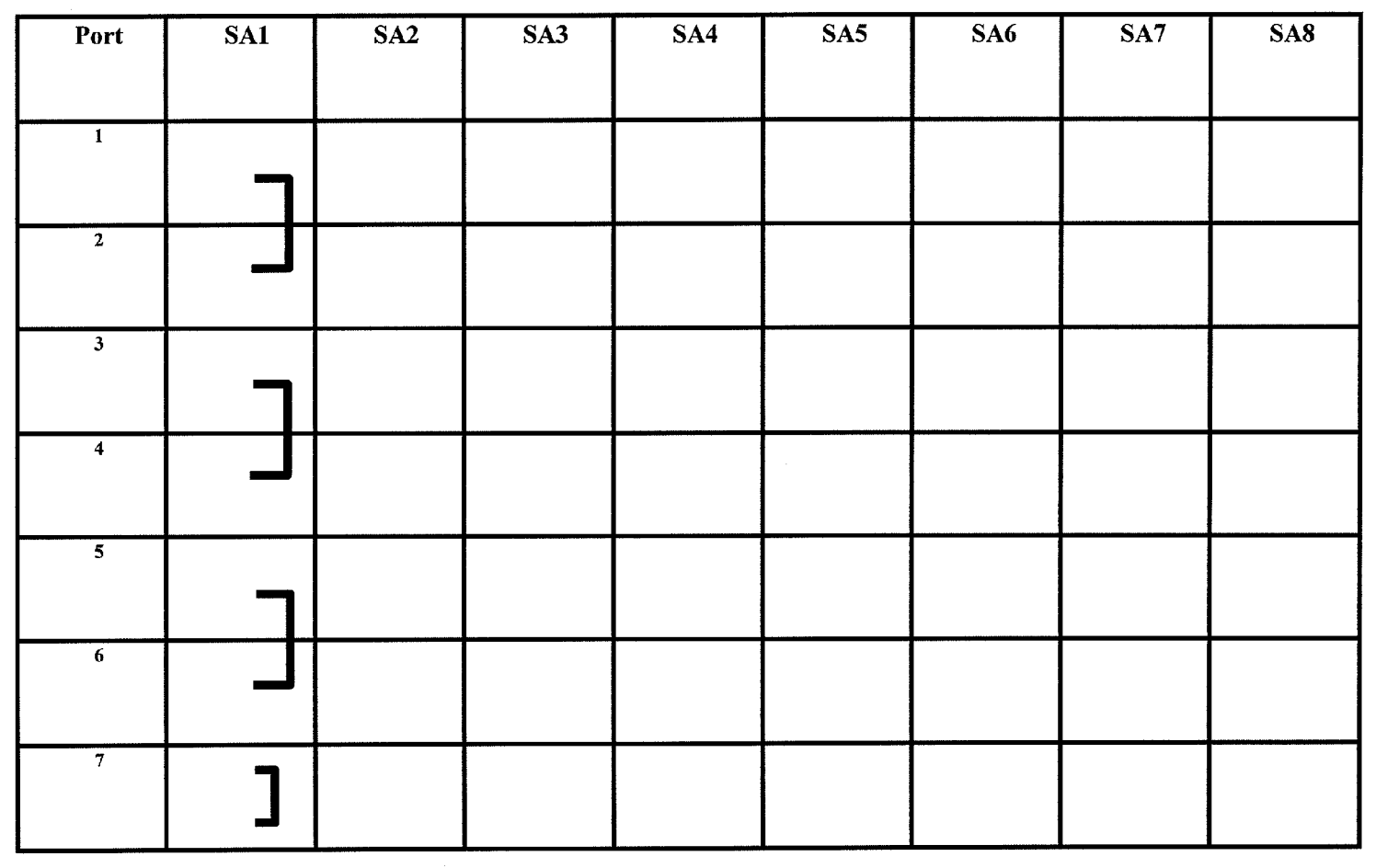

FIG. 6 schematically illustrates the port connections for the subassembly of FIG. 5. FIG. 7 illustrates re-routing the port connections via midplane 105 for the subassembly of FIG. 5 for Ports 1-7. In this embodiment, port 8 does not have an output line and therefore is not electrically connected or wrapped like the other ports. However, another computer system may include subassemblies in which all ports may be re-routed according to the present invention.

FIG. 7 shows Processors P1 through P8 of an 8 way subassembly or node. In this embodiment, the processors are shown as pairs since for this product they are packaged as 4 dual processor chips. Processor 1 controls port 1, Processor 2 controls port 2 and so on through Processor 7. Since a computer system has up to 8 subassemblies, each subassembly can only communicate with 7 others so there are only 7 ports on each subassembly. Because of this there is no 8th port, although there are 8 Processors. This leaves Processor P8 without a port connection. This is also what drives the wrapping within a port, on port 7. FIG. 7 illustrates that Processor P7 shows two lines to the midplane. However, for P7, each line in the figure represents half the data lines to/from the port so that the two lines represent all the data lines of the port (to better illustrate the wrapping). However, for Processors P1 through P6, each line represents all the data lines for the port they are connecting to.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for testing a processor subassembly, comprising:

providing a computer system comprising a plurality of subassemblies, wherein each subassembly comprises:

a plurality of processors having internal communication paths, and an odd number of ports that provide external communication paths to other subassemblies via a midplane circuit board, for each subassembly, electrically connecting pairs of ports so that a port of one processor is connected to a port of another processor via the midplane circuit board, and for the odd number port, wrapping the port within itself via the midplane circuit board by using half of the data lines as outputs and the other half of data lines as inputs, thereby re-routing external communication paths back to the subassembly instead of to other subassemblies and allowing communication between the processors through external paths; and testing each subassembly one at a time by exercising all communication paths and ports.

* * * * *